United States Patent
Bojiuc

(10) Patent No.: US 8,232,695 B2
(45) Date of Patent: Jul. 31, 2012

(54) ELECTROMAGNETIC MACHINE WITH INDEPENDENT REMOVABLE COILS, MODULAR PARTS AND SELF SUSTAINED PASSIVE MAGNETIC BEARING

(75) Inventor: Dumitru Bojiuc, Marina Del Rey, CA (US)

(73) Assignee: ClearWater Holdings, Ltd, Marina Del Rey, CA (US)

( * ) Notice: Subject to any disclaimer, the term of this patent is extended or adjusted under 35 U.S.C. 154(b) by 197 days.

(21) Appl. No.: 12/308,630

(22) PCT Filed: Jul. 9, 2008

(86) PCT No.: PCT/US2008/008434
§ 371 (c)(1),
(2), (4) Date: Jul. 21, 2010

(87) PCT Pub. No.: WO2009/009075
PCT Pub. Date: Jan. 15, 2009

(65) Prior Publication Data
US 2010/0289363 A1 Nov. 18, 2010

(51) Int. Cl.
*H02K 11/00* (2006.01)
*H02K 3/04* (2006.01)
*H02K 1/22* (2006.01)
*H01R 39/04* (2006.01)

(52) U.S. Cl. .......... 310/71; 310/208; 310/267; 310/268; 310/233

(58) Field of Classification Search .................... 310/71, 310/266–268, 156.37, 128, 135–136, 173, 310/224
See application file for complete search history.

(56) References Cited

U.S. PATENT DOCUMENTS

| | | | | |
|---|---|---|---|---|
| 4,458,228 A * | 7/1984 | Baumgartner | ................ | 335/229 |
| 5,977,684 A * | 11/1999 | Lin | ............................... | 310/268 |
| 6,011,339 A * | 1/2000 | Kawakami | .................... | 310/208 |
| 7,633,198 B2 * | 12/2009 | Kirkman et al. | ................ | 310/71 |
| 7,755,244 B2 * | 7/2010 | Ley et al. | ............... | 310/216.019 |

* cited by examiner

Primary Examiner — Quyen Leung
Assistant Examiner — Thomas Truong
(74) *Attorney, Agent, or Firm* — Gene Scott; Patent Law & Venture Group

(57) ABSTRACT

A rotating electromagnetic machine has a tubular axle with mounting rings, a common ring, a coil input ring, and at least one bearing set mounted on it. A fitting is secured at a distal end of the tubular axle, and a commutator is secured at the proximal end. A housing is mounted on the bearing sets through adaptors. Connecting bars extend axially within the axle with lateral rods joined to the connecting bars at their distal ends, the bars commuting between segments of the commutator electromagnetic coils. A plurality of the electromagnetic coils are secured to the coil input ring. The coils are formed of spiral turns of a single flat strip electrically conductive material. A plurality of peripheral and sector magnets are mounted adjacent to the electromagnetic coils with electromagnetic interaction when relative motion occurs between the coils and the magnets.

3 Claims, 18 Drawing Sheets

ELECTROMAGNETIC MACHINE WITH INDEPENDENT REMOVABLE COILS, MODULAR PARTS AND SELF SUSTAINED PASSIVE MAGNETIC BEARING

FIELD OF THE INVENTION

This invention relates generally to electric motors and generators and more particularly to such an electromagnetic machine with novel structure and operation.

DESCRIPTION OF THE RELATED ART

Tu et al, US 2004/0135452, discloses a flat rotary electric generator that includes at least one toroidal coil structure for cutting magnetic lines to induce a current and at least one disc-shaped magnetic pole structure oriented parallel to the helical coil structure. If multiple toroidal coil structures and disc-shaped magnetic coil structures are included, the toroidal coil structures and disc-shaped magnetic coil structures are arranged in alternating manner. The toroidal coil structure and disc-shaped magnetic pole structure are not provided with a permeable material. When either the toroidal coil structures or the at least one disc-shaped magnetic pole structure is rotated by an external force, the toroidal coil structure cuts the magnetic lines passing therethrough to generate an induced current.

Neal, US 2002/0135263, discloses a plurality of stator arc segments that form a toroidal core for a stator assembly used to make a motor. In a preferred embodiment, a plurality of magnetic fields is created when electrical current is conducted through wire wound around poles on the toroidal core. A monolithic body of phase change material substantially encapsulates the conductors and holds the stator arc segments in contact with each other in the toroidal core. Hard disc drives using the motor, and methods of constructing the motor and hard disc drives are also disclosed.

Rose, U.S. Pat. No. 6,803,691, discloses an electrical machine that comprises a magnetically permeable ring-shaped core centered on an axis of rotation and having two axially-opposite sides. Coils are wound toroidally about the core and disposed sequentially along the circumferential direction. Each coil includes two side legs extending radially alongside respectively sides of the core. Coil-free spaces exist between adjacent side legs. A bracket has first and second side flanges that are connected by a bridging structure and respectively abut the first and second sides of the coil.

Mohler, U.S. Pat. No. 6,507,257, discloses a bi-directional latching actuator that is comprised of an output shaft with one or more rotors fixedly mounted thereon. The shaft and rotor are mounted for rotation in a magnetically conductive housing having a cylindrical coil mounted therein and is closed by conductive end caps. The end caps have stator pole pieces mounted thereon. In one embodiment, the rotor has at least two oppositely magnetized permanent magnets which are asymmetrically mounted, i.e., they are adjacent at one side and separated by a non-magnetic void on the other side. The stator pole piece has asymmetric flux conductivity and in one embodiment is axially thicker than the remaining portion of the pole piece. An abutment prevents the rotor from swinging to the neutral position (where the rotor magnets are axially aligned with the higher conductivity portion of the pole piece). Thus, the rotor is magnetically latched in one of two positions being drawn towards the neutral position. Energization of the coil with an opposite polarity current causes the rotor to rotate towards its opposite latching position whereupon it is magnetically latched in that position.

Mohler, U.S. Pat. No. 5,337,030, discloses a permanent magnet brushless torque actuator that is comprised of an electromagnetic core capable of generating an elongated toroidally shaped magnet flux field when energized. Outside the generally cylindrical coil is an outer housing with upper and lower end plates at each end. Mounted to the end plates and extending towards each other are stator pole pieces separated from its opposing pole piece by an air gap. A permanent magnet rotor is disposed in the air gap and mounted on a shaft which in turn is rotatably mounted in each of the end plates. The permanent magnet rotor comprises at least two permanent magnets, each covering an arcuate portion of the rotor and having opposite polarities. Energization of the coil with current in one direction magnetizes the pole pieces such that each of the two pole pieces attracts one of the magnets of the rotor and repels the other magnet of the rotor resulting in a torque generated by the output shaft. Reversal of the current flow results in a reversal of the torque and rotation of the rotor in the opposite direction. Preferred embodiments are disclosed having multiple cells, i.e. a plurality of stator rotor stator combinations and/or cells in which there are a plurality of pole pieces at each stator pole plane.

Kloosterhouse et al, U.S. Pat. No. 5,191,255, discloses an electromagnetic motor that includes a rotor having a plurality of magnets mounted along a perimeter of the rotor. Preferably, adjacent magnets have opposite poles facing outward. One or more electromagnets are disposed adjacent to the perimeter of the rotor so that as the rotor rotates, the magnets mounted on the rotor are carried near the poles of the electromagnets. Current is supplied to the electromagnets by a drive circuit in a predetermined phase relationship with the rotation of the rotor such that, for substantially all angular positions of the rotor, magnetic attraction and repulsion between the poles of the electromagnets and the magnets mounted on the rotor urge the rotor to rotate in a desired direction. Reflective material is mounted on the rotor in predetermined angular positions. The drive circuit includes a photosensitive device which produces a signal whose value varies according to whether the device is receiving light reflected from the reflective material. The signal is amplified to produce drive current for the electromagnets.

Westley, U.S. Pat. No. 4,623,809, discloses a stepper motor housing a pole structure in which a pair of identical stator plates, each having a plurality of poles, are positioned back to back with the poles projecting in opposite directions, the stator plates being positioned between a pair of substantially identical stator cups, each stator cup having a plurality of poles projecting inwardly from a back wall with a peripheral side wall terminating in an outwardly extending flange. A major surface of each flange is in contact with a face on one of the stator plates so as to assure a low reluctance magnetic path.

Fawzy, U.S. Pat. No. 4,565,938, discloses an electromechanical device which can be used as a motor or as a generator. The device has a housing, including bearing means to support a rotatable shaft. Disc magnet means are provided, and poled to have alternating polarity and are mounted on the shaft to define a rotor. The device includes at least one first pole shoe in contact with the magnet means, having a portion extending radially therefrom to define a virtual pole chamber, of a first polarity. Also included is at least one second pole shoe in contact with the magnet and having a portion extending radially therefrom to define a virtual pole chamber of the other polarity. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means are provided for electrical contact with the stator to draw off current when the device is operated as a generator, or provide current to operate the device as a motor.

Fawzy, U.S. Pat. No. 4,459,501, discloses an electromechanical device which can be used as a motor or as a generator that has a housing, including bearing means to support a rotatable shaft. A pair of disc magnets are poled to have opposite polarity on the two faces of each. The magnets are mounted face to face together on the shaft to define a rotor. The device includes at least one first pole shoe in contact with one face of each magnet, and having a portion extending radially therefrom to define, in its preferred form, a pair of virtual pole chambers, of the same polarity as said one face. Also included is at least one second pole shoe in contact with the other face of each magnet and having a portion extending radially therefrom to define in its preferred form a pair of virtual pole chambers of the same polarity as the other face. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means for electrical contact with the stator draw off current when the device is operated as a generator, or provide current to operate the device as a motor.

SUMMARY OF THE INVENTION

The present invention teaches certain benefits in construction and use which give rise to the objectives described below. In one embodiment, the present invention functions as an electric motor, in a second embodiment it functions as a rotating electric generator, and in a third embodiment it functions as a rotating transformer. In further embodiments, the present invention may operate as a linear machine rather than rotating. In each of these embodiments, the machine may be operated as an AC machine or a DC machine. The machine operates by coupling a moving electromagnetic field to magnets in attraction and also in repulsion. In each embodiment, primary electromagnets produce a field which couples to secondary magnets, which may be permanent magnets or electromagnets, with either the primary or the secondary magnets functioning as part of a stator structure of the machine, i.e., neither rotating nor translating. An important aspect of the present invention, in one structural embodiment, pertinent to the embodiments previously defined, is a novel electromagnetic coil structure wound or formed as spiral turns of a single flat strip of an either ferromagnetic or non-ferromagnetic material. A further important aspect of the present invention is the modularity of the entire construction by use of coil special shape housings of ferromagnetic material which is separated into a plurality of segments magnetically isolated from each other but in mutual electrical continuity and hence minimizing hysteresis effects. Another important aspect of the present invention is the incorporated self sustained passive magnetic bearing as a result of the permanent magnets sweeping a portion of the aluminum shaft ring beneath the permanent magnets and located between the guiding ball bearing and the electromagnets ferromagnetic core. Another important aspect of the present invention is the permanent magnets edges cut in a distinct angle, such as at 45 degrees, or triangular in shape which allows a continuous magnetic one pole face and avoids the alternating magnetic end effect at both ends of the permanent magnet. Another important aspect of the present invention is the useful capture of induced eddy currents of each ferromagnetic segment and sent back in the electrical circuit of the power supply.

A primary objective of the present invention is to provide an apparatus and method of use of such apparatus that yields advantages not taught by the prior art.

Another objective of the invention is to produce a machine as described herein having a high electromagnetic field density.

A further objective of the invention is the elimination of the need for a commutator.

A further objective of the invention is the establishment of low losses including losses derived from hysteresis, heat, radiation and eddy currents, which reduce the efficiency of typical machines of the present type.

A further objective of the invention is to produce a rotating machine with a compact, modular structure.

A further objective of the invention is to provide a rotating machine with open access to the interior of its central shaft on its axis of rotation.

A further objective of the invention is to provide rotating and translating machines with self sustained passive magnetic bearings as part of their integrated construction.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate the embodiments of the present invention. In such drawings.

DETAILED DESCRIPTION OF THE INVENTION

The above described drawing figures illustrate the present invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
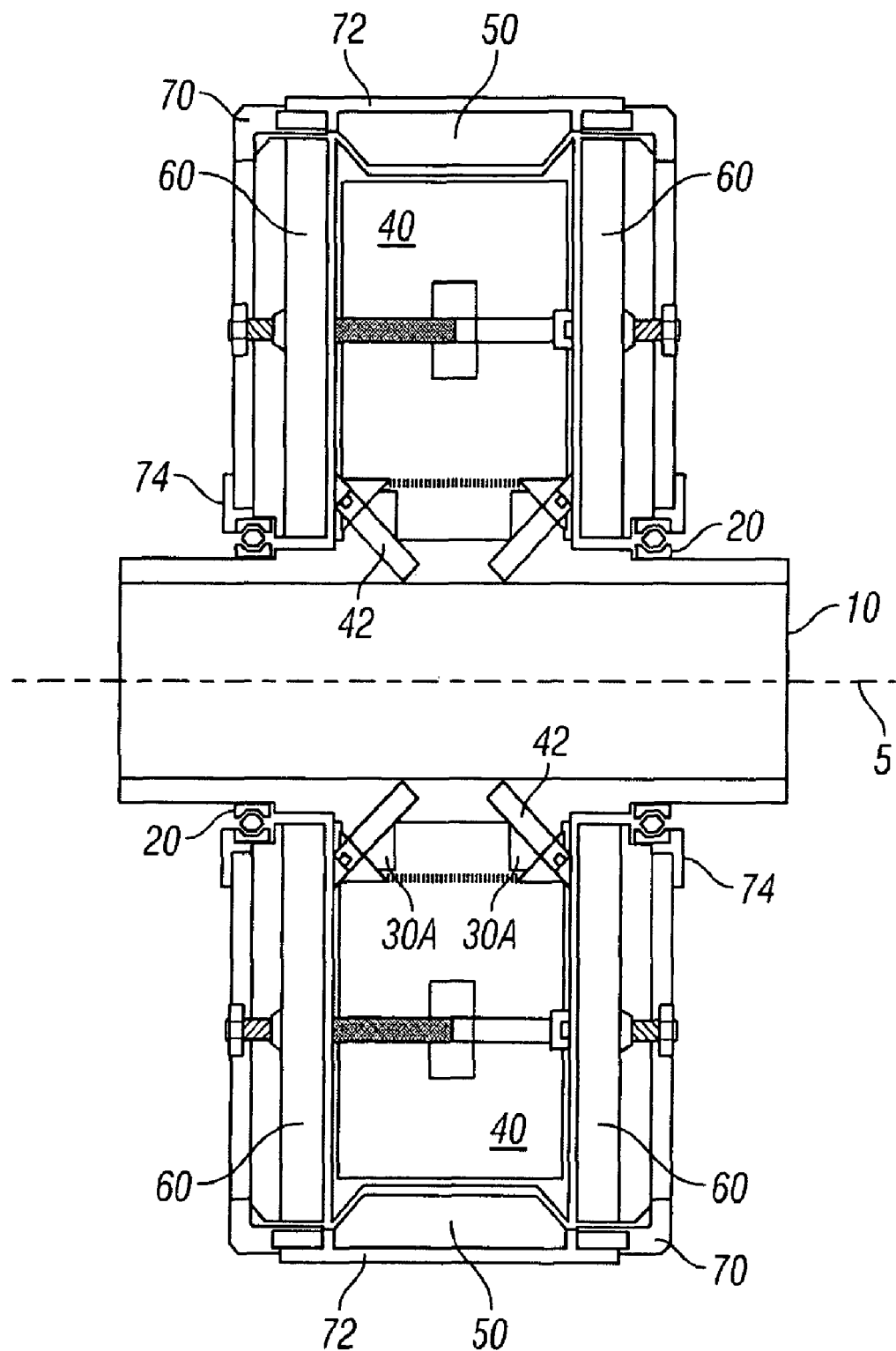
FIG. 1 is a schematic diagram of the present invention shown in cross-section.

The present invention is a rotating electromagnetic machine which may be used in several ways as described above as is familiar to those of skill in the art. The physical construction especially that of the electromagnetic coils and the coil housings, the manner of interconnecting the coils to the commutator and most of the structural configurations of this machine are novel. FIG. 1 is a schematic diagram of the present invention shown in cross-section which shows some of the major constructional features of this machine. FIG. 1 shows the machine's tubular axle 10, bearing sets 20, mounting rings 30A, coil housings 40, coil housing bolts 42, peripheral magnets 50, sector magnets 60, system housing plates 70 and peripheral plates 72. These components will be described in detail in the following referring to the attached pictorials where numerals shown thereon are found in this text.

Figure 2:
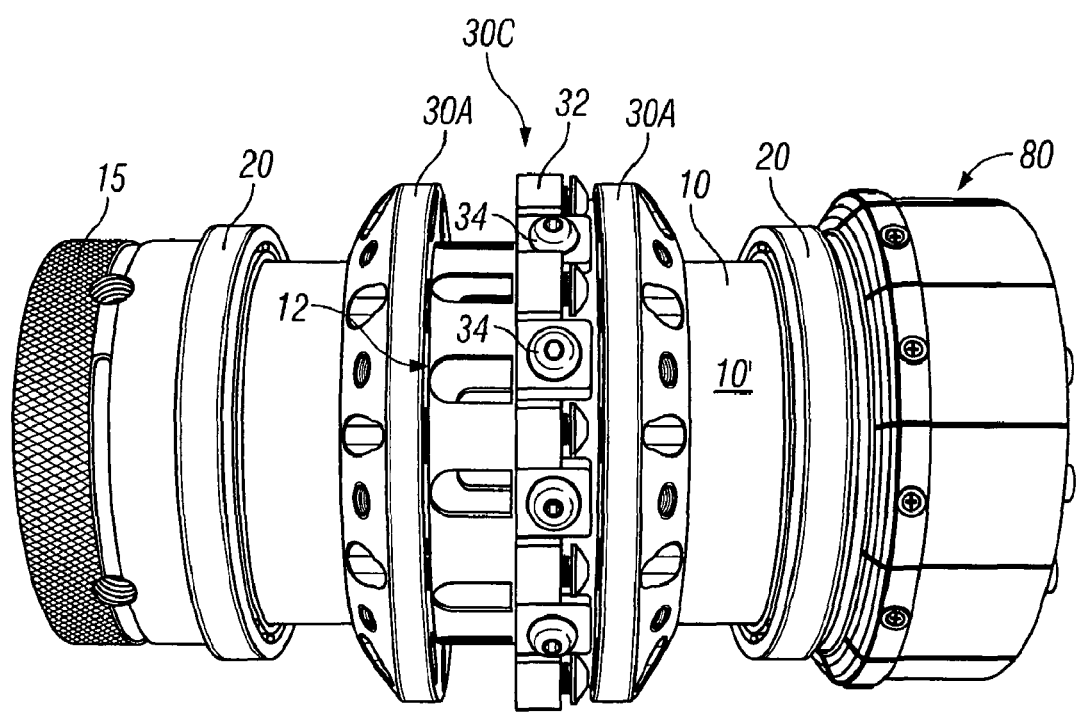
FIG. 2 is a side view of a rotational tubular axle of the present invention shown with bearing sets 20, bearing securing fitting 15, mounting rings 30A, coil interconnection ring 30C, magnetic bearing aluminum ring sweep surface 10', and commutator 80.
Figure 3:
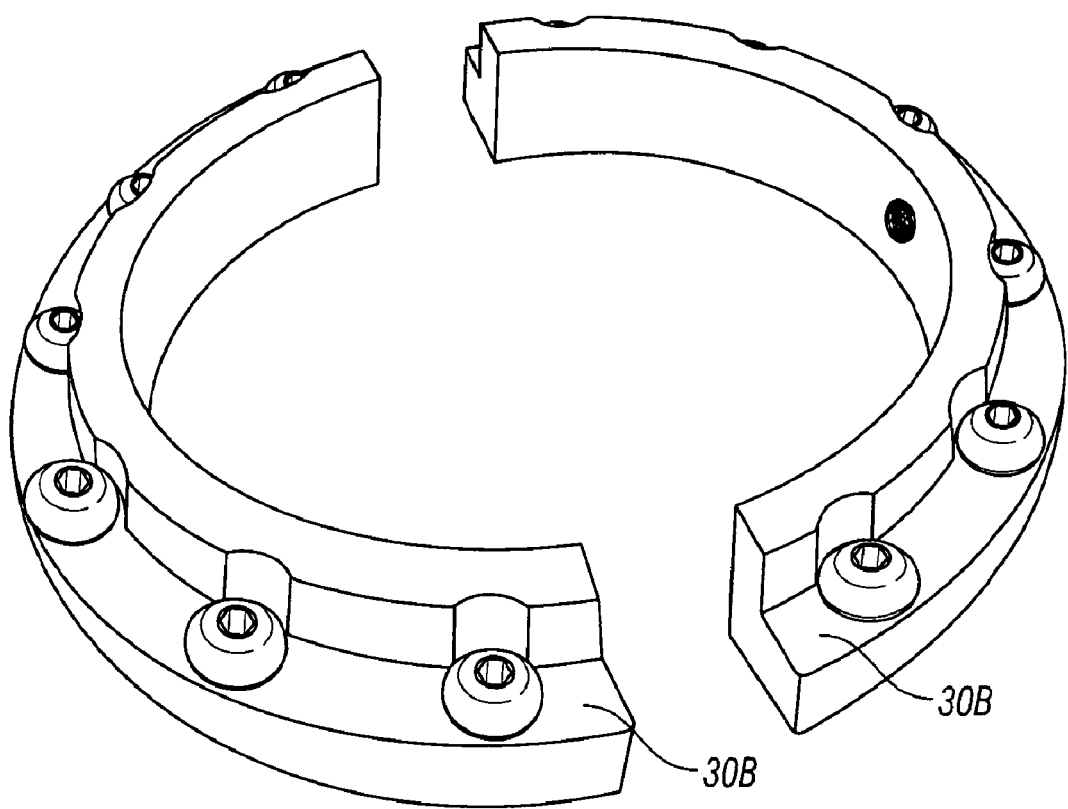
FIG. 3 is a perspective view of a circuit common ring 30B.
Figure 4:
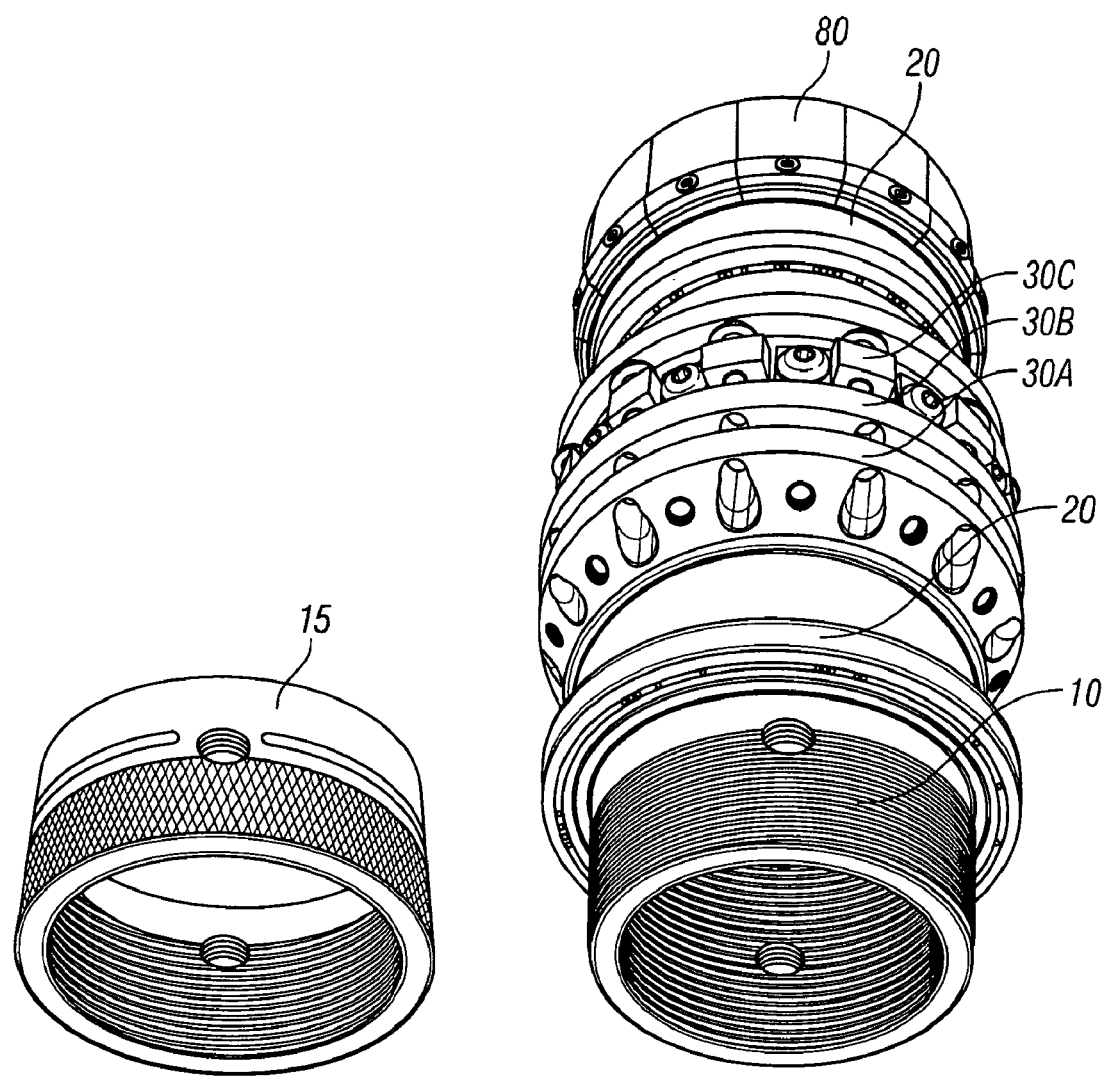
FIG. 4 is a perspective end view thereof as seen with the bearing securing fitting detached.

FIG. 2 is a side view of the rotational tubular axle 10 and its magnetic bearing aluminum swept surface 10', showing bearing sets 20, bearing securing fitting 15, commutator 80, mounting rings 30A and coil input ring 30C. In FIG. 1 it is seen that housing 70 is mounted on bearing sets 20 through adaptors 74. Either the housing 70 or axle 10 may act as stator with the other member rotating. FIG. 3 is a perspective view of coil common ring 30B which is constructed in two pieces and is independently removable from axle 10, whereas mounting rings 30A are an integral part of axle 10. FIG. 4 is a perspective end view of axle 10 with the securing fitting 15 detached.

Figure 5:
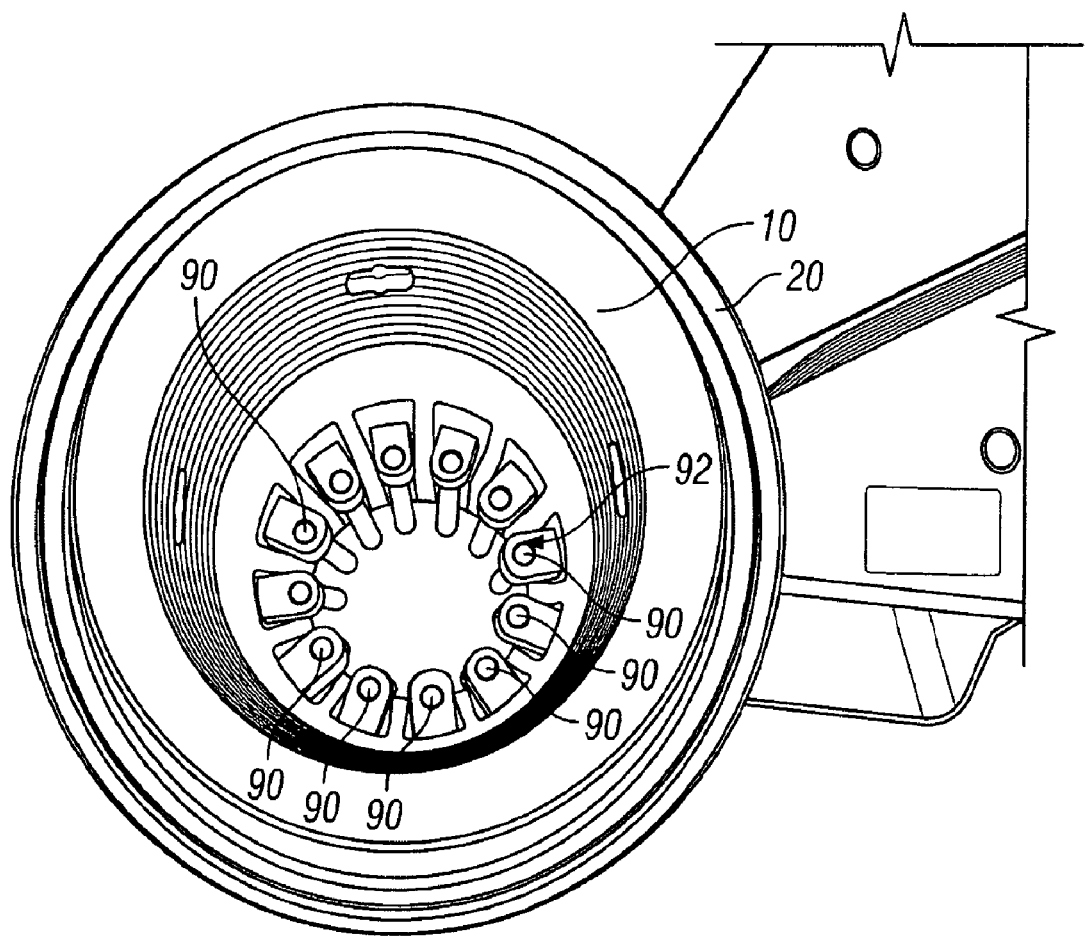
FIG. 5 is an end view thereof as seen from the bearing securing fitting and showing proximal ends of connecting bars.
Figure 6:
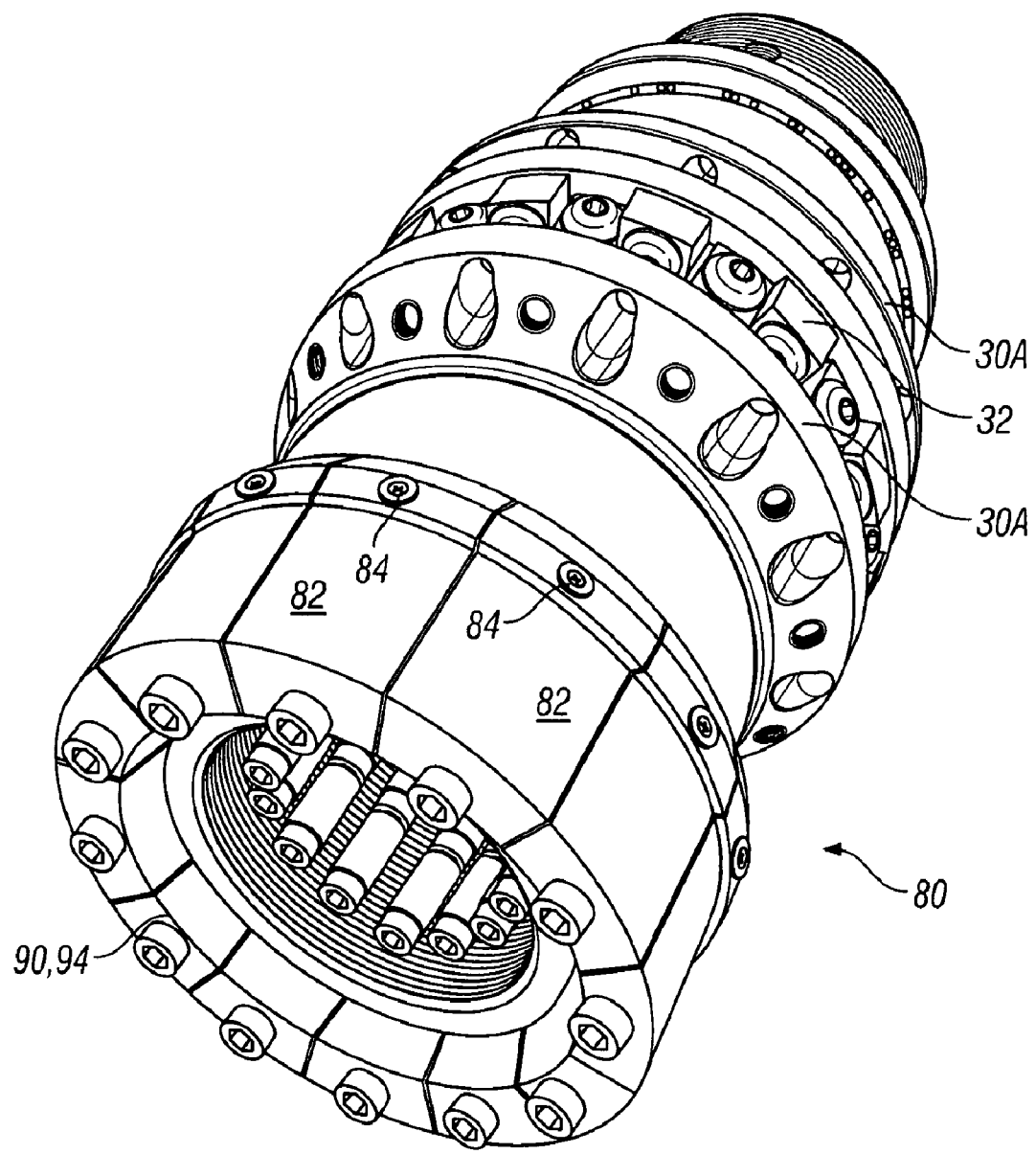
FIG. 6 is a perspective end view thereof as seen from the commutator.
Figure 7:
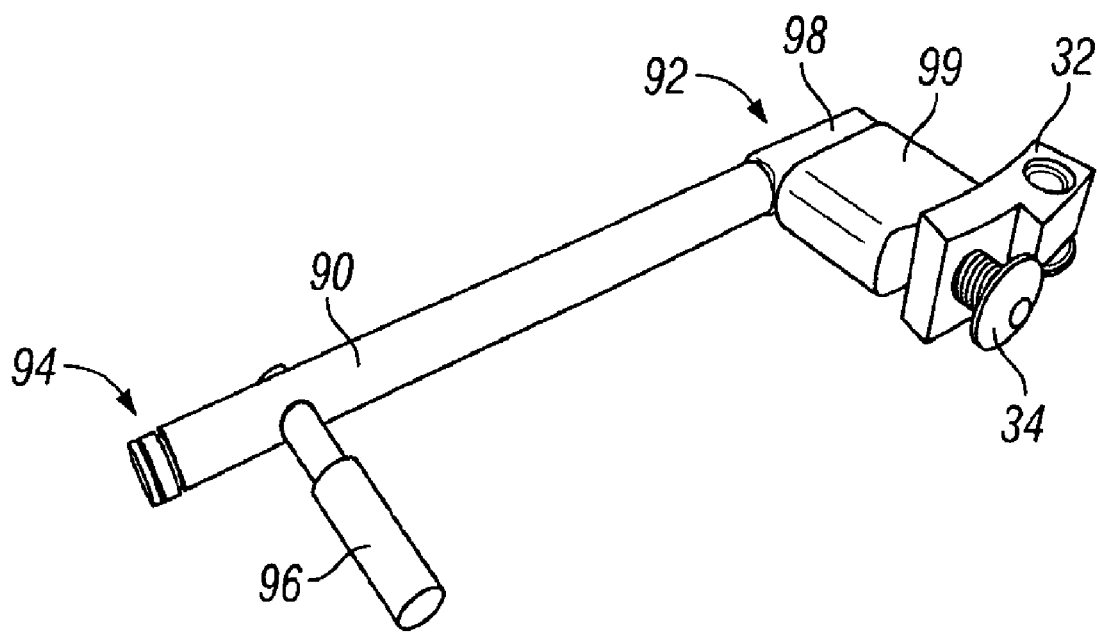
FIG. 7 is a perspective view of one of the connecting bars.

What is not depicted in FIG. 1, but is shown in FIG. 5; an end view from the securing fitting side, is proximal ends 92 of connecting bars 90 which extend axially within axle 10 as will be further shown. FIG. 6 is a perspective end view thereof as seen from the commutator end of the machine, showing distal ends 94 of connecting bars 90. FIG. 7 is a perspective view of one of the connecting bars 90, as detached, showing the proximal 92 and distal 94 ends. A lateral rod 96 joined to bar 90 at the distal end 94, commutes between bar 90 and one segment 82 of commutator 80 and is secured by screws 84 as shown in FIG. 6. The distal end 94 is joined with lateral plate 98 which is covered with an insulator wrap 99 and secured to coil input ring 30C through slots 12 in axle 10, as shown in FIG. 2, using tab 32 and screw 34. Screw 36 is available for securing coil wires as will be described presently. Bars 90, including rods 96, plates 98 and tabs 32 form the necessary electrical path between electromagnet coils of the machine (to be described), and the commutator 80. In the preferred embodiment, coils 110 are wired in parallel with current introduced from the commutator 80 through lateral rods 96, bars 90, plate 98 to insulated segments (tabs 32) mounted on input ring 30C. One end of each of the coils 110 are attached to each of tabs 32 respectively, at screws 36. The other end of each of the coils 110 are attached to the screws on common ring 30B which acts as a ground back to the commutator 80.

Figure 8:
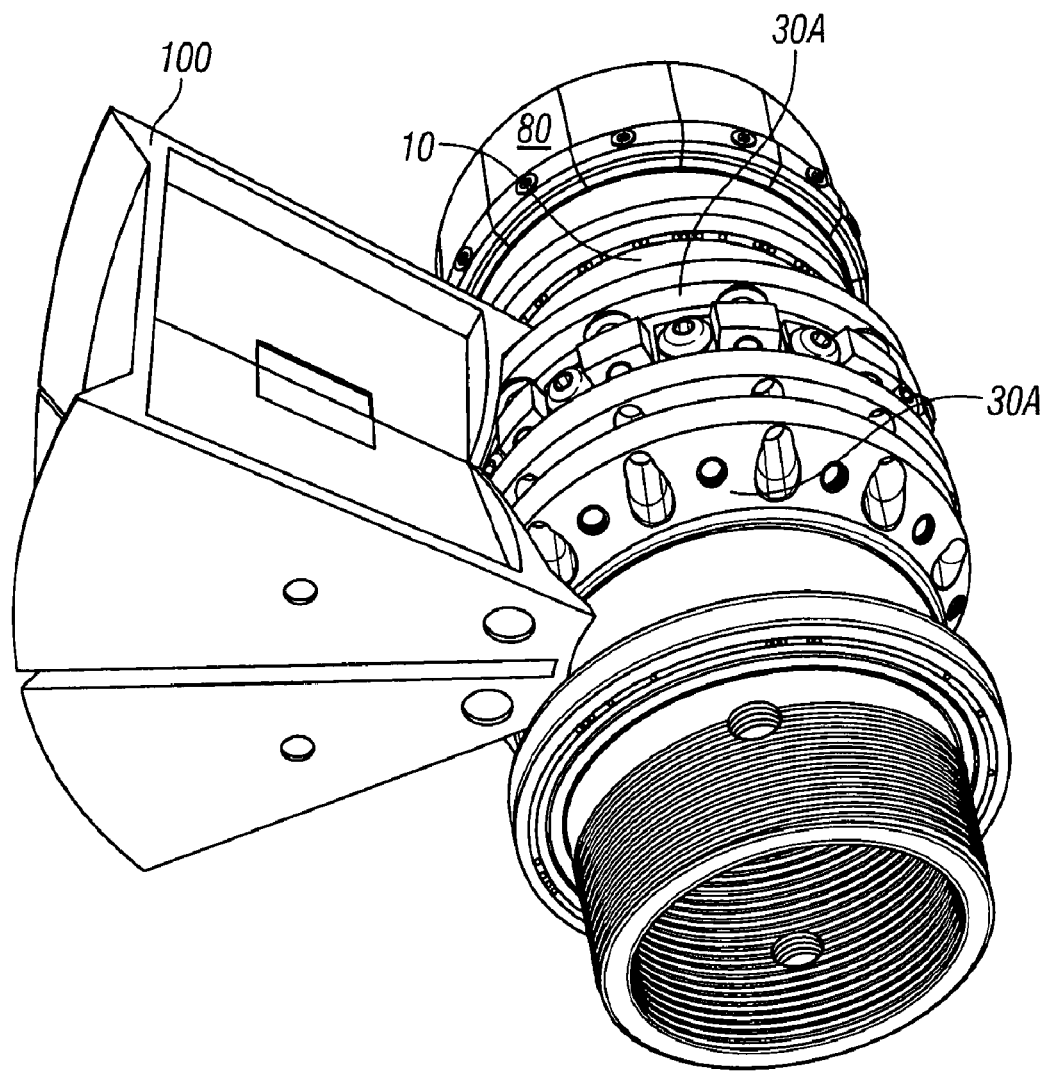
FIG. 8 is a perspective view thereof showing the two half coil housings mounted on the mounting rings as seen from the bearing securing fitting end.
Figure 9:
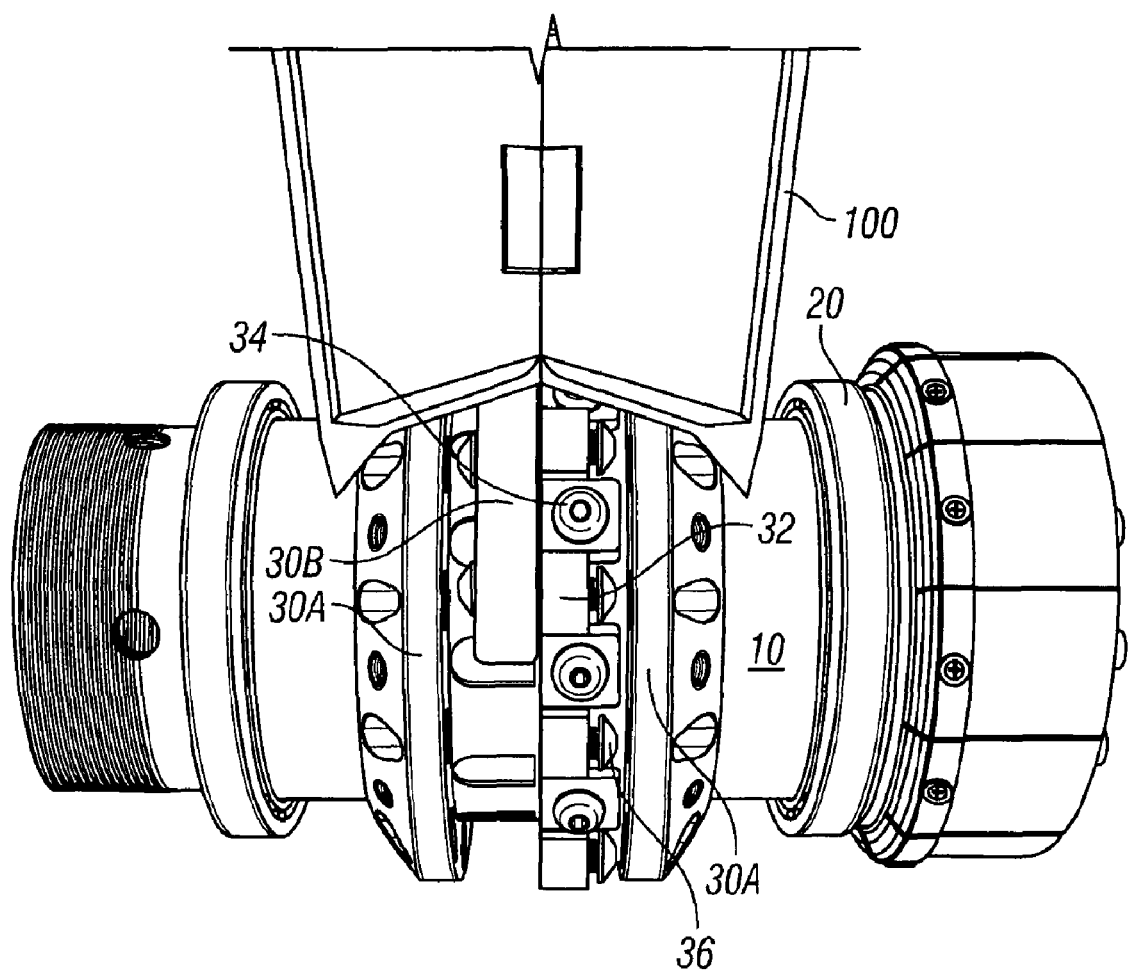
FIG. 9 is a close up partial side perspective view thereof showing the mounting interface between a coil housing and the mounting rings.
Figure 10:
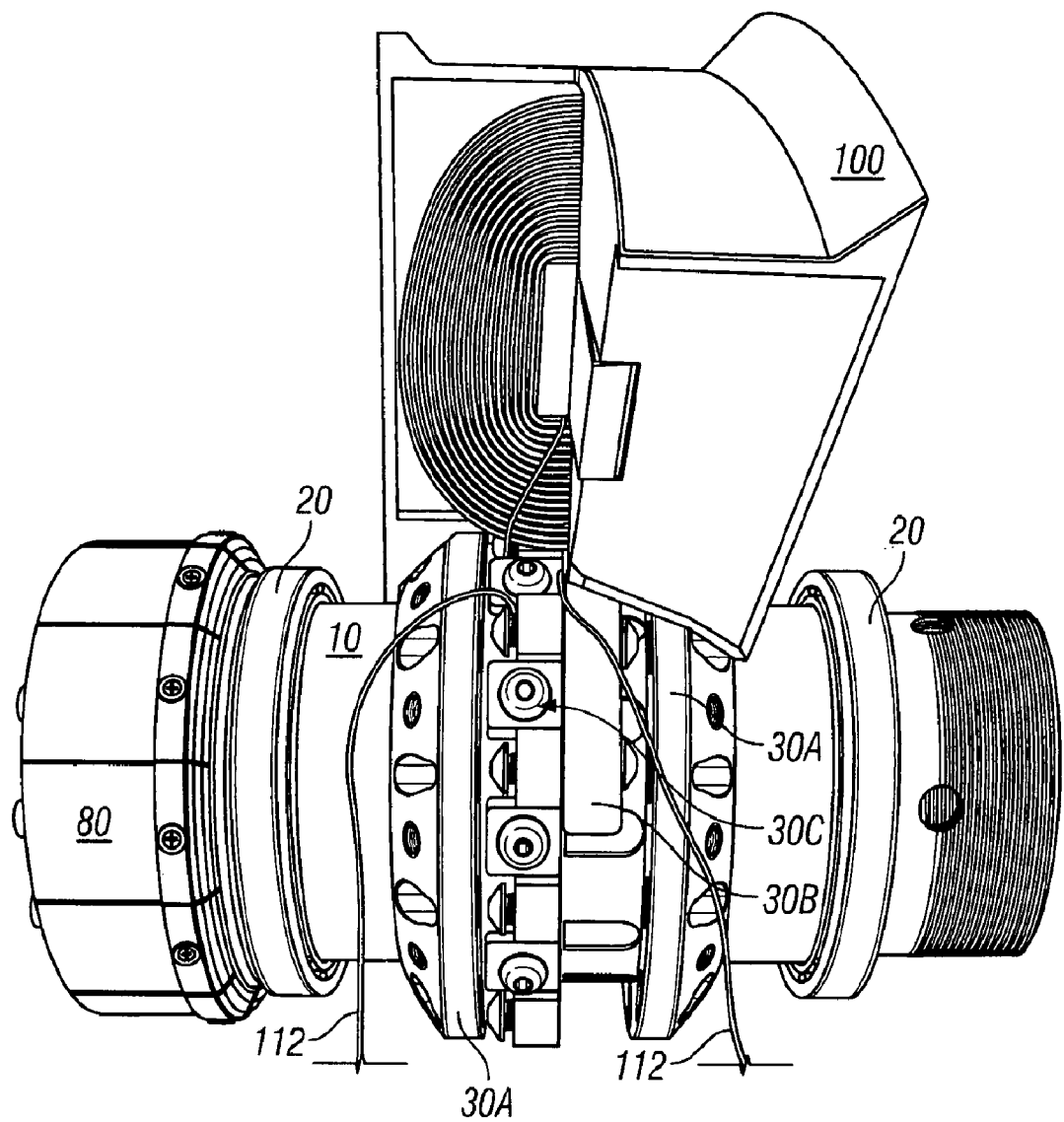
FIG. 10 is a partial side perspective view thereof showing a coil as mounted within a coil housing.
Figure 11:
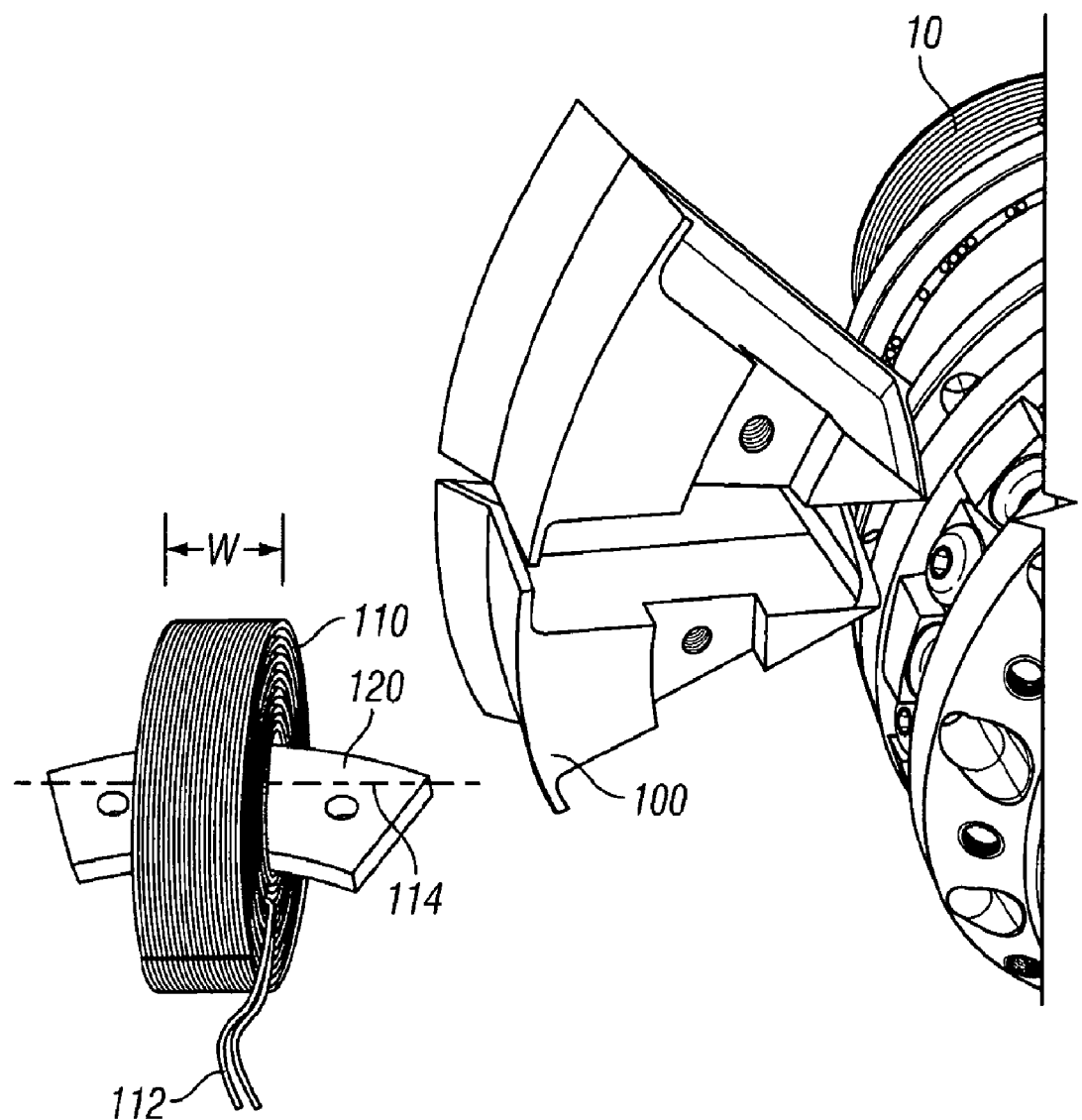
FIG. 11 is a perspective view thereof of a coil either wire or tape as wound onto a coil form on a magnetic or non-magnetic material core like steel or aluminum, and a coil housing showing coil form mounting surfaces.
Figure 12:
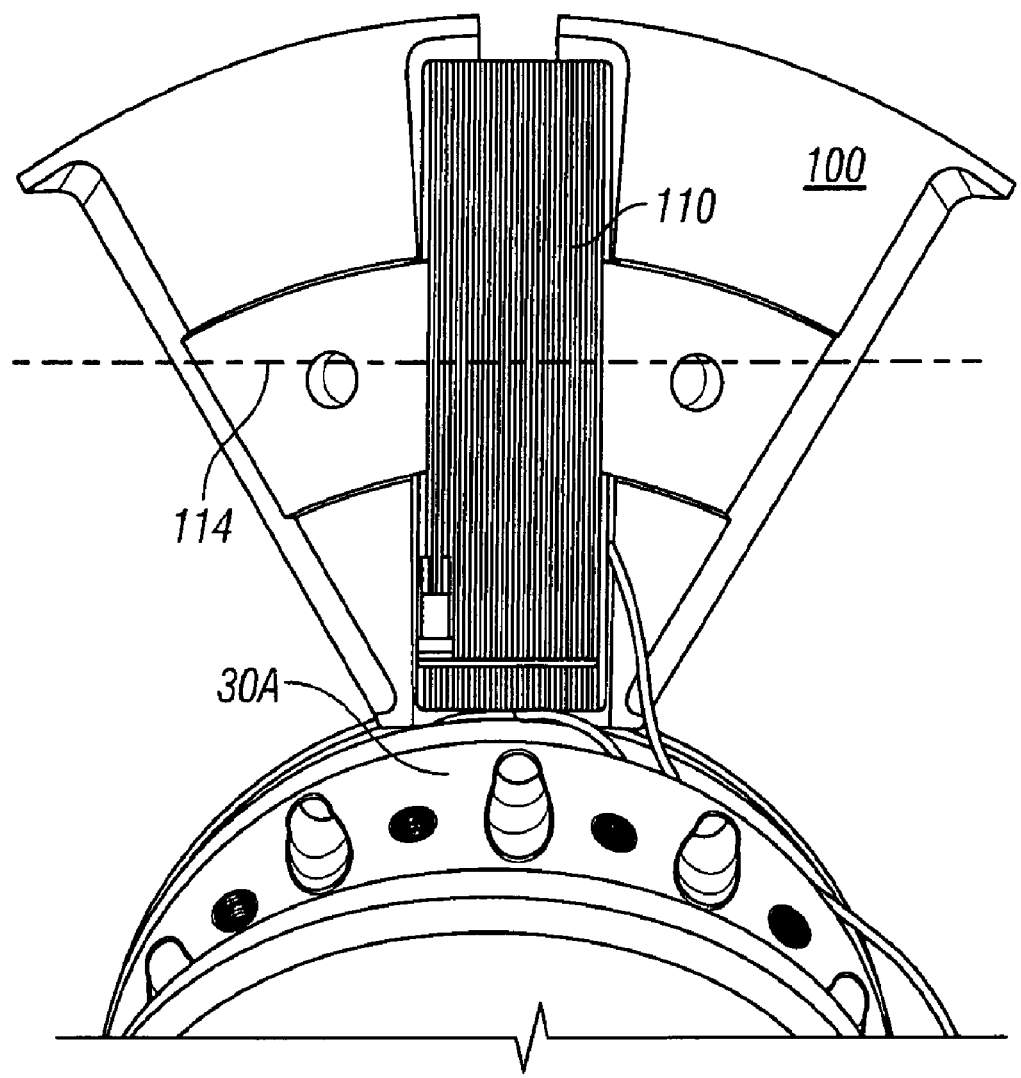
FIG. 12 is a side view of the coil housing thereof with coil and coil form in place.

FIG. 8 shows two coil housings 100 mounted on the rings 30A by coil housing bolts 42 (FIG. 1) fastened into threaded holes. FIG. 9 is a close up showing the novel mounting interface between coil housings 100 and the mounting rings 30A. In this mounting it is noticed that the interfacing surfaces of the coil housings 100 abut rings 30A and are close to rings 30B and 30C. FIG. 10 shows part of the coil housing 100 removed revealing a portion of a coil 110 as mounted within the coil housing 100. FIG. 11 shows the coil 110 detached from the coil housing 100 and shows, too, coilform 120 upon which coil 110 is wound. In this embodiment coil 110 is wound with common insulated wire 112, however, coil 110 may also be wound with metal strip wherein such strip would have a thickness approximately equal to the diameter of wire 112 and a width W equal to the width of coil 110, or of the ferromagnetic housing cell's width as shown in FIG. 11. It is noticed that coil 110 has an axis 114 of the windings that is positioned tangential to the direction of rotation of the electromagnetic field of this machine when the coil is mounted within the coil housing 120. This may be best seen in FIG. 12 where coil 110 is shown mounted within coil housing 120, and housing 120 is shown in its mounted position on ring 30A Only two coil housings 120 are shown in the figures, but in the completely assembled machine, the coil housings 120 form a full circle around tubular axle 110.

Figure 13:
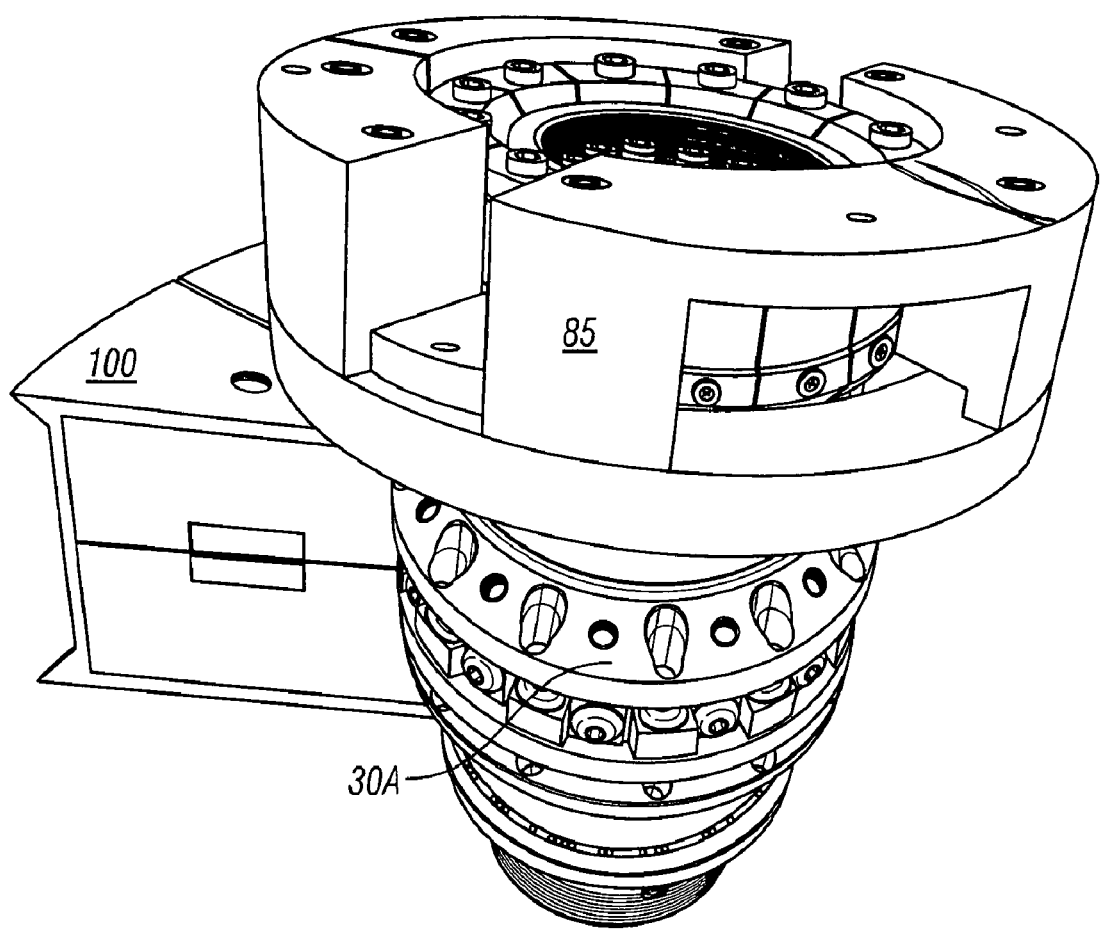
FIGS. 13 and 14 are perspective views thereof showing a commutator housing positioned over the commutator.
Figure 14:
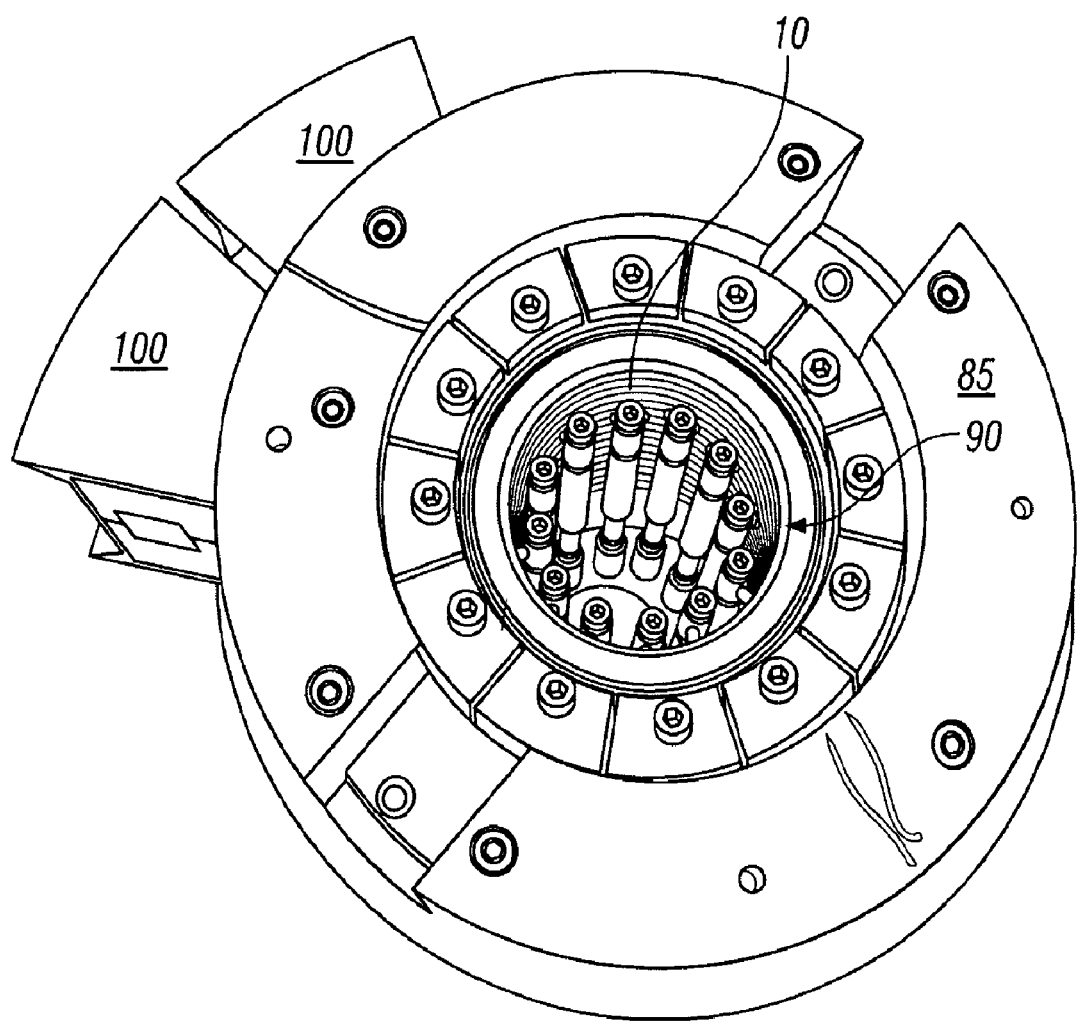
Figure 15:
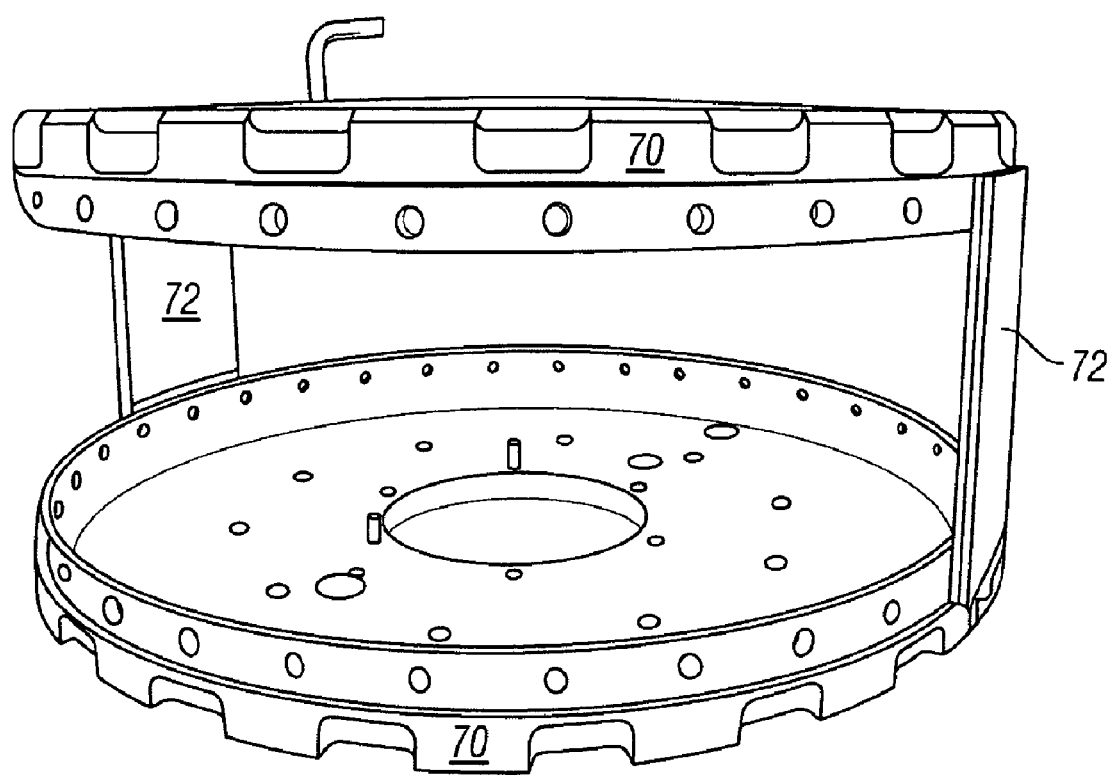
FIGS. 15 and 16 are perspective views of system housing plates thereof.
Figure 16:
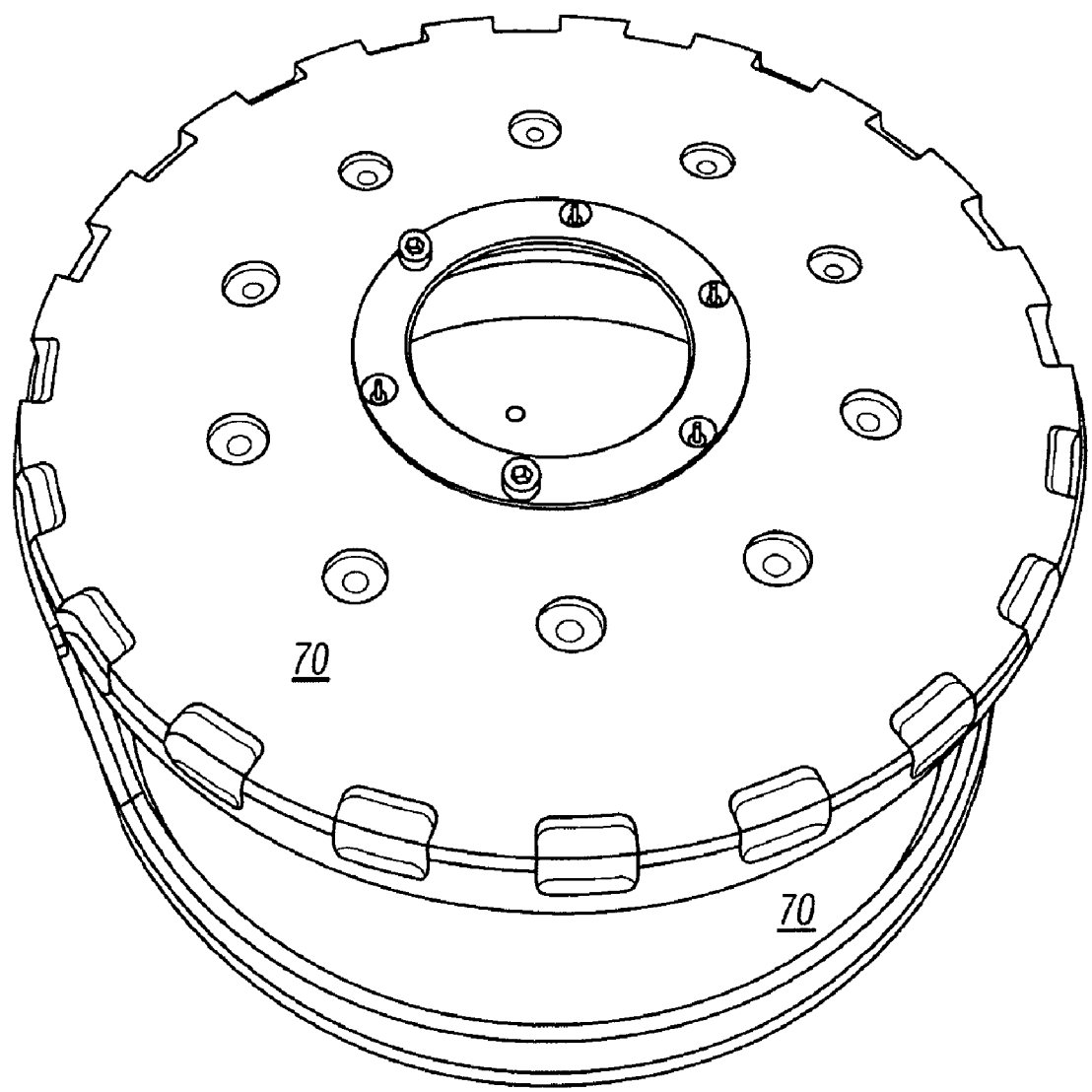
Figure 17:
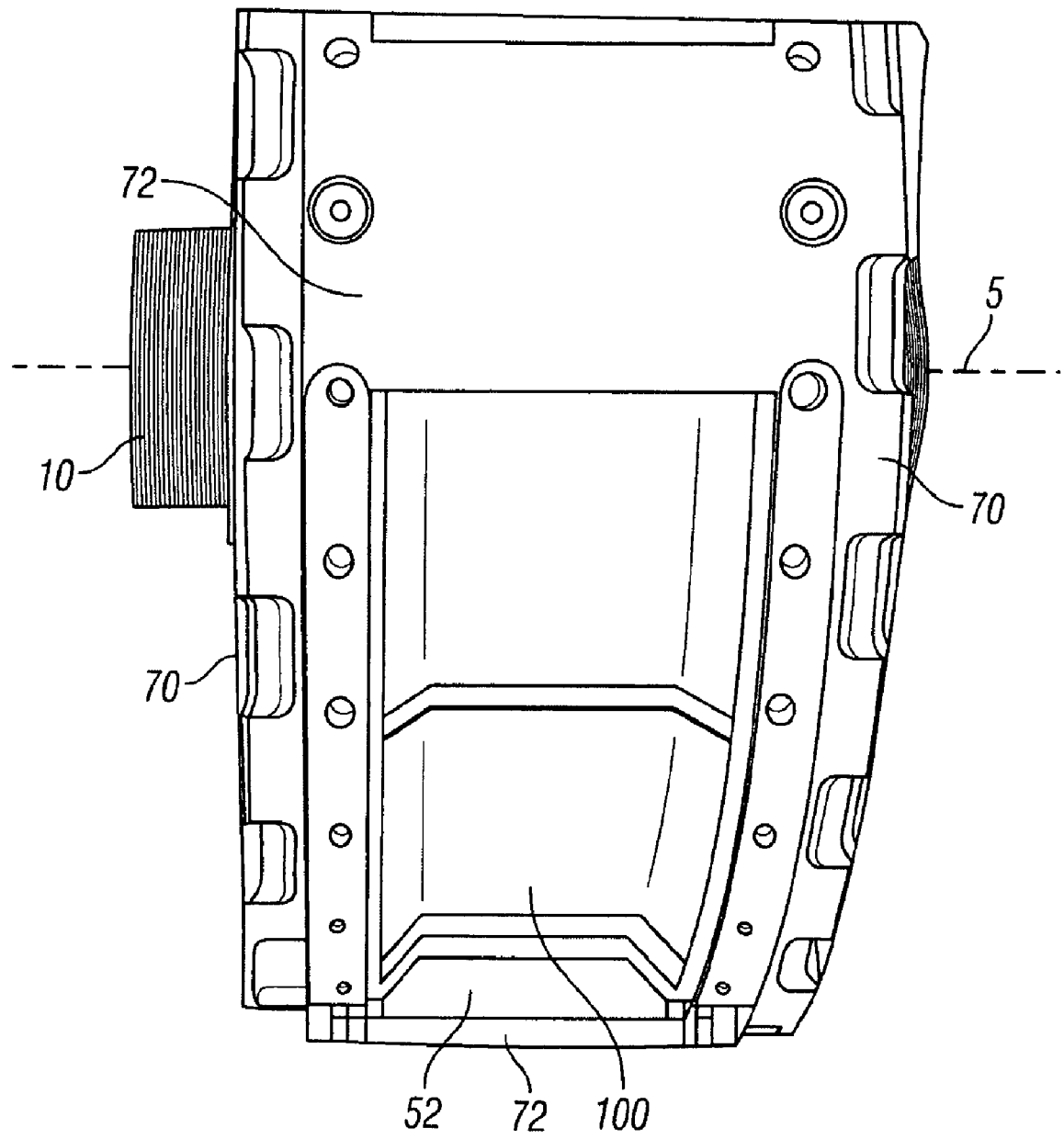
FIG. 17 is a partial side perspective view of the presently described apparatus showing physical relationships between coil housings, peripheral angle cut magnets adjacent to the ferromagnetic core's shape and the system housing plates.

FIGS. 13 and 14 show a commutator housing 85 positioned over the commutator 80. Housing 85 provides the wipers that frictionally contact the blades of commutator 80. FIGS. 15 and 16 are views of the system housing plates 70 which are shown in their assembled positions in FIG. 1. Plates 70 are engaged with the outer bearing races of bearing sets 20 through adaptors 74 shown in schematic representation in FIG. 1. FIG. 17 shows the finished machine as a side view with two peripheral plates 72, commonly known as "biscuits," removed, to show the locations of peripheral magnets 50 and coil housings 100. The axis 5 of rotation of the rotating magnetic field is depicted in FIG. 17.

Figure 20:
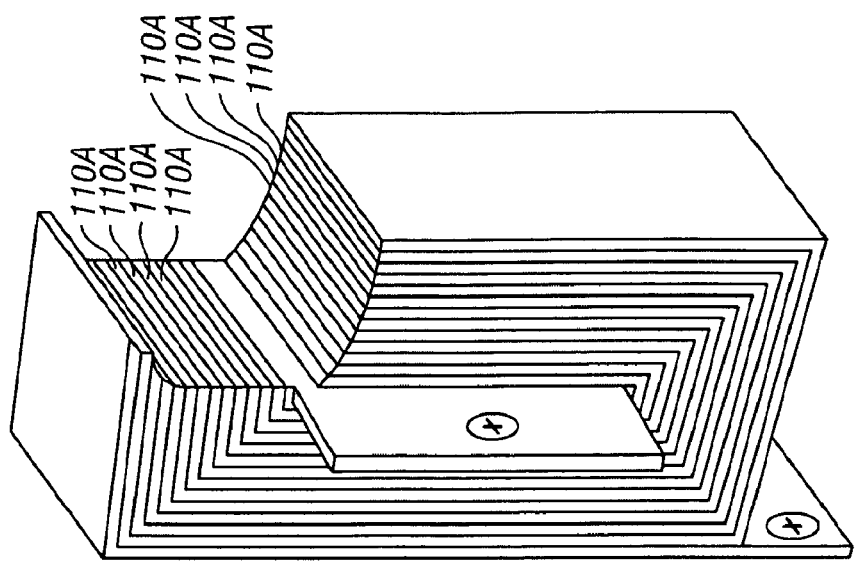
FIGS. 18-20 are conceptual diagrams of an advanced electromagnet coil thereof.
Figure 19:
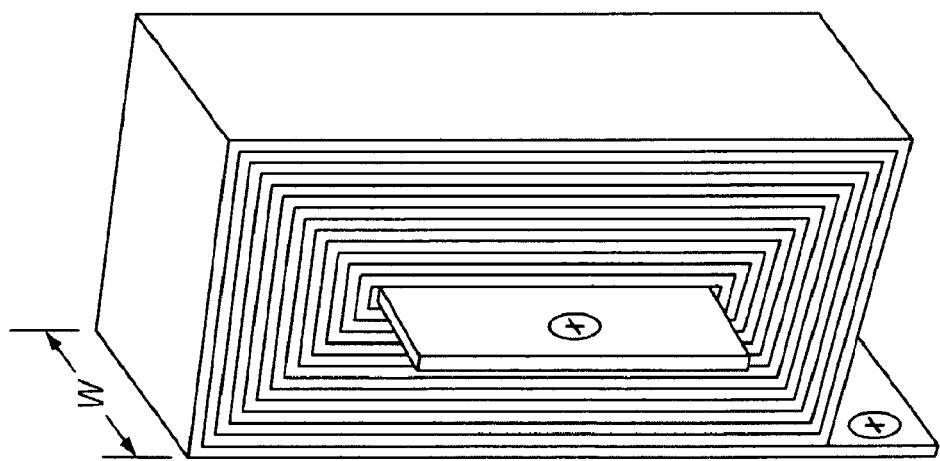
Figure 18:
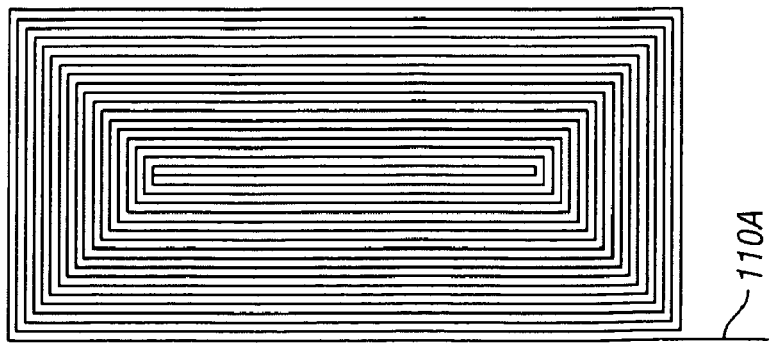

FIGS. 18-20 show an alternative embodiment of coil 110. Previously coil 110 was described as constructed by windings of common insulated electrical conductor wire 112 as is well known in the art, and alternatively using flexible insulated conductive metal strip stock. However, it has been discovered that coil 110 may also be advantageously constructed from a solid block of conductive metal. In FIG. 18 is shown a schematic diagram of such a coil 110 wherein the lines 110A represent conductive paths and the spaces between the lines represent material that is cut away from the solid block of conductive metal. This may be accomplished using electrical discharge machining, also known by the acronym EDM. In this process EDM is used to cut into the solid block of electrically conductive material such as copper, aluminum or steel, but most preferably, iron, and the cuts are directed as shown in FIG. 18. When the cutting is complete, the solid block has been reduced to a single coil where the coil's windings are strips having the desired width W (FIG. 19), i.e., the width of the original solid block.

FIG. 19 shows the cut block in perspective with plus (+) and minus (−) electrodes attached for connecting the coil 110 into a circuit of the present machine. FIG. 20 shows the same cut block as FIG. 19, but partially cut-away to better illustrate the layers of the windings. In FIGS. 19 and 20 no space is shown separating the windings, however, these figures are conceptual diagrams where the spaces between adjacent windings are considerably less wide than the windings themselves, and the spaces may be filled with an electrical insulator using an electro-chemical process such as electroplating. The coil housing 100 may also be advantageously constructed in the same manner as the coil shown in FIGS. 18-20, that is, the housing 100 may be sectioned using EDM to establish a coil-like configuration while maintaining the housing in the form shown in FIGS. 8-12. The establishment of coil 110 and coil housing 100 in the above manner provide significant advantages including low eddy current loss, less resistance to AC and to DC current flow, and smaller size.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements.

Changes from the described subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto.

What is claimed is:

1. A rotating electromagnetic machine comprising:
a tubular axle defining a distal and a proximal ends thereof, and mounted medially thereon, a pair of mounting rings, a common ring, a coil input ring, and at least one bearing set; a fitting is secured at the distal end of the tubular axle, and a commutator is secured at the proximal end of the tubular axle;
a housing mounted on the bearing sets through adaptors; the common ring constructed in two pieces and independently removable from axle,
connecting bars extending axially within axle; lateral rods joined to connecting bars at distal end thereof, the lateral rods commuting between bars and segments of commutator with distal ends joined with lateral plates;
a plurality of electromagnetic coils secured to the mounting rings, the coils formed of spiral turns of a single flat strip electrically conductive material; and
a plurality of peripheral and sector magnets mounted adjacent to the electromagnetic coils.

2. The rotating electromagnetic machine of claim 1 assembled with a modular construction with coil housings of a ferromagnetic material separated into a plurality of magnetically isolated segments in mutual electrical continuity, whereby hysteresis is minimized.

3. The rotating electromagnetic machine of claim 1 wherein each of the peripheral and sector magnets has edges cut in a shape that enables a continuous magnetic pole face and avoids an alternating magnetic end effect at opposing ends of the magnet, whereby, induced eddy currents of the ferromagnetic segments are returned to the electrical circuit thereof.

* * * * *